United States Patent [19]
Emery

[11] Patent Number: 5,392,593
[45] Date of Patent: Feb. 28, 1995

[54] MOBILE APPARATUS FOR CUTTING VEGETATION

[75] Inventor: Benjamin H. Emery, Pittsburgh, Pa.

[73] Assignee: Emery Tree Service, Inc., Indianola, Pa.

[21] Appl. No.: 54,181

[22] Filed: Apr. 26, 1993

[51] Int. Cl.6 .............................................. A01D 34/66
[52] U.S. Cl. ...................................... 56/15.2; 56/230; 56/314
[58] Field of Search ...................... 56/15.2, 15.1, 14.9, 56/16.4 R, DIG. 12, 230, 231, 232, 314

[56]  References Cited
U.S. PATENT DOCUMENTS

| | | | |
|---|---|---|---|
| 972,058 | 10/1910 | Chisholm | 56/230 |
| 1,869,123 | 7/1932 | Walters | 56/232 |
| 2,786,320 | 3/1957 | Larson | 56/230 |
| 3,949,539 | 4/1976 | Cartner | 56/10.4 |
| 4,074,510 | 2/1978 | Teagle | 56/233 |
| 4,315,396 | 2/1982 | Oka et al. | 56/320.1 |
| 4,445,312 | 5/1984 | Cartner | 56/15.5 |
| 4,502,269 | 3/1985 | Cartner | 56/15.5 |
| 4,713,898 | 12/1987 | Bull et al. | 37/96 |
| 4,996,830 | 3/1991 | Davison | 56/14.7 |
| 5,174,098 | 12/1992 | Emery | 56/10.7 |

Primary Examiner—Terry L. Melius
Attorney, Agent, or Firm—Kirkpatrick & Lockhart

[57] ABSTRACT

A mobile vegetation cutting apparatus that has a mobile chassis adapted for travel on a railroad trackway. Attached to the mobile chassis are at least two independently pivotal boom assemblies that can be selectively pivoted to vegetation cutting positions on both sides of the trackway. A cutting head assembly having a vegetation cutting member operably attached thereto is attached to each boom assembly. Each cutting head assembly is equipped with guard members that can be pivoted to open and closed positions for permitting large items of vegetation to engage a cutting member while substantially preventing cutting debris from being ejected therefrom.

38 Claims, 14 Drawing Sheets

MOBILE APPARATUS FOR CUTTING VEGETATION

BACKGROUND OF THE INVENTION

1. Field of the Invention

The present invention relates to mobile apparatuses for cutting vegetation and, more particularly, is directed to mobile apparatuses adapted to selectively cut a variety of forms of vegetation on both sides of a discrete pathway such as a railroad right-of-way.

2. Description of the Invention Background

According to the American Railroad Association, there are approximately 173,000 miles of actively used railroad tracks in the United States. Such tracks traverse a variety of different types of terrain ranging from desert land to heavily wooded hardwood forests. In the wooded areas or areas where brush and vegetation adjoin the railroad right-of-ways, that vegetation requires periodic maintenance to prevent it from overgrowing or overlaying the tracks. Since the very first steam engine chugged along the tracks, railroad personnel have been plagued with the problem of controlling the growth of vegetation adjoining railroad right-of-ways.

Over the years, a variety of methods have been developed to control the growth of vegetation along railroad tracks. The earliest methods typically involved sending groups of individuals equipped with saws, sickles, and scythes to trim the vegetation along the tracks. Such method, while somewhat effective, was labor intensive and time consuming.

With the advancement of chemical research, came the development of herbicides for controlling the growth of vegetation. Such herbicide could be sprayed onto the surrounding vegetation by spraying devices mounted on a vehicle designed to ride upon the rails. This method of vegetation control, however, is not particularly well adapted for removal of large forms of vegetation such as tree branches and the like that overhang the trackway.

Other mobile apparatuses have been developed for cutting vegetation along railroad right-of-ways. For example, the apparatus in U.S. Pat. No. 4,996,830 to Davison can be arranged to ride upon railroad tracks and cut adjacent vegetation and trees. That apparatus, however, cannot cut trees and vegetation simultaneously on both sides of the railroad tracks while moving therealong. In particular, the operator must cut the vegetation on one side of the tracks and then pivot the cutting head to the opposite side of the tracks to cut the vegetation on that side before advancing the device along the tracks. As such, while that apparatus eliminates much of the manual labor associated with prior vegetation cutting methods, it is still quite time consuming because the cutting head must be moved from one side of the track to the other before the vehicle can be advanced. In addition, this apparatus cannot cut brush immediately adjacent to the tracks while simultaneously trimming larger adjacent vegetation such as trees and tree branches.

Another railroad right-of-way brush and weed cutting apparatus is disclosed in U.S. Pat. No. 2,786,320 to Larson. That apparatus is designed to ride upon the railroad tracks while cutting weeds and brush located immediately adjacent to and between the rails. That device, however, lacks the capability to trim larger articles such as trees and tree branches and the like that are located a few feet away from the railroad tracks, yet may overhang the tracks.

Thus, there is a need for a mobile vegetation cutting apparatus that can travel on railroad tracks and safely cut vegetation, trees, and branches simultaneously on both sides of the trackway while moving therealong. There is a further need for a mobile vegetation cutting apparatus that can cut vegetation at various levels above and below the railway bed on both sides of the railroad right-of-way. There is yet another need for a vegetation cutting device that can safely cut a variety of different types of vegetation.

SUMMARY OF THE INVENTION

In accordance with the present invention, there is provided a mobile vegetation cutting apparatus comprising a mobile chassis, preferably adapted for travel on railroad tracks. At least two boom assemblies are independently pivotally attached to the mobile chassis and are capable of being selectively pivoted to a plurality of vegetation cutting positions. Each boom assembly has a cutting member attached thereto for cutting a variety of different types and sizes of vegetation.

It is an object of the present invention to provide a mobile vegetation cutting apparatus adapted to simultaneously cut vegetation on both sides of a discrete pathway along which the apparatus is traveling.

It is another object of the present invention to provide a mobile apparatus adapted to ride upon a railroad trackway that has the capability of simultaneously cutting vegetation on both sides of the trackway or simultaneously cutting brush and trim trees located both immediately adjacent to and not immediately adjacent to one side of the trackway while the mobile apparatus is stationary or is moved along the trackway, in,each case without tipping the apparatus.

Yet another object of the present invention is to provide a mobile vegetation cutting apparatus with a plurality of independently operable cutting members that are operated by independent power sources.

Still another object of the present invention is to provide a cutting member guard that is attached to a cutting member housing and permits relatively large items of vegetation to be admitted into the housing while substantially preventing debris created by the cutting process from being thrown from the cutting member housing.

Accordingly, the present invention provides solutions to the aforementioned problems associated with other vegetation cutting apparatuses. The reader will appreciate that, in addition to the aforementioned details and objects, other advantages associated with the use of the present invention will become apparent as the following detailed description of the present preferred embodiment thereof proceeds.

BRIEF DESCRIPTION OF THE DRAWINGS

In the accompanying drawings, I have shown a present preferred embodiment of the invention wherein like reference numerals are employed to designate like parts and wherein.

DETAILED DESCRIPTION OF A PREFERRED EMBODIMENT

Figure 1:
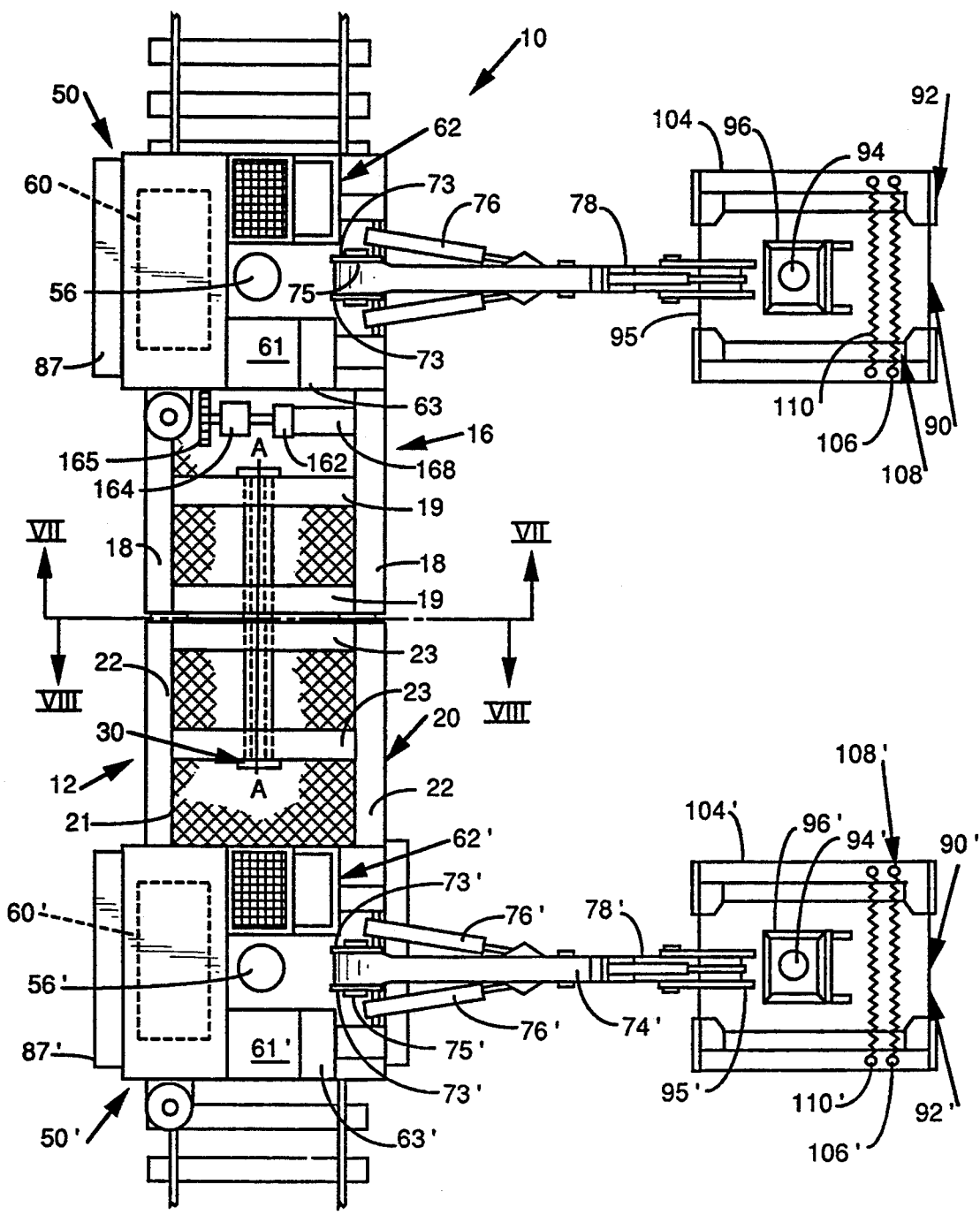
FIG. 1 is a plan view of a mobile vegetation cutting apparatus of the present invention with the boom assemblies thereof pivoted to the same side of the railroad tracks upon which it is riding.

Referring now to the drawings for the purposes of illustrating a present preferred embodiment of the invention only and not for purposes of limiting the same, the Figures show a mobile vegetation cutting apparatus generally designated as 10. In its preferred form, the mobile vegetation cutting apparatus 10 is adapted for self-propelled travel on railroad tracks. However, those of ordinary skill in the art will appreciate that the mobile vegetation cutting apparatus of the present invention can be adapted to travel and cut vegetation along any discrete pathway or roadway such as, for example, highways, gas line right-of-ways, and electrical line right-of-ways without departing from the spirit and scope of the present invention.

Figure 2:
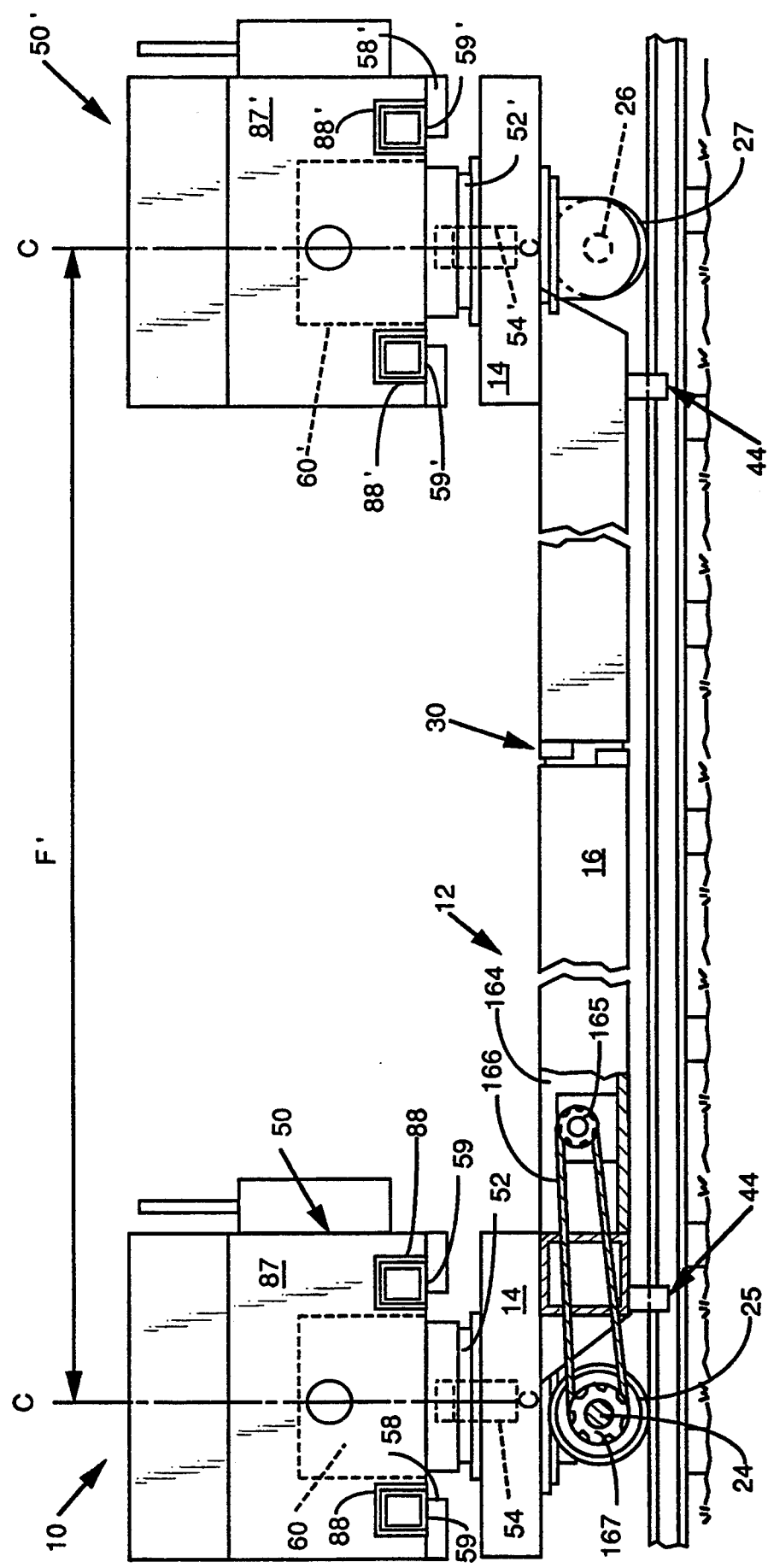
FIG. 2 is a left side elevational view of the mobile vegetation cutting apparatus of FIG. 1.

More particularly and with reference to FIGS. 1 and 2, there is shown a mobile vegetation cutting apparatus 10 which includes a mobile chassis 12 that has two drive units, generally designated as 50 and 50', rotatably supported thereon. The chassis 12 is preferably fabricated from heavy duty (i.e., 12"×12") steel tubing and has a front portion generally designated as 16 and a rear portion generally designated as 20. The front portion 16 is preferably rectangular in shape when viewed from above and consists of two, spaced-apart, parallel side members 18 that are interconnected by a plurality of cross members 19. Similarly, the rear chassis portion 20 is rectangular in shape and consists of two spaced-apart side members 22 that are interconnected by a plurality of cross members 23. As can be seen in FIG. 1, expanded metal screen 21 is preferably removably fastened (i.e., by bolting) to the front chassis portion 16 and the rear chassis portion 20 to enable one to walk between the drive units 50 and 50'.

As can be seen in FIG. 2, a front axle 24 supports the front portion 16 of the chassis 12 on front wheels 25 while a rear axle 26 supports the rear chassis portion 20 on rear wheels 27. The reader will appreciate from the disclosure to follow that the mobile vegetation cutting apparatus 10 of the present invention can be selectively propelled forward or rearward on the railroad tracks. As such, the designations of "front" and "rear" as used herein are for explanatory purposes only and should not, in any way, be construed as limiting the scope of the present invention.

In the preferred embodiment, wheels 25 and 27 are adapted to ride upon typical railroad tracks. However, as was mentioned above, the mobile vehicle of the present invention could be adapted for travel along discrete pathways such as, for example, gas line right-of-ways, roadways and the like, by adding a conventional steering mechanism that is known in the art and by providing appropriate wheels 25 and 27 suited for travel on the terrain being traversed. As such, wheels 25 and 27 could comprise a variety of different tire-bearing wheels or combination of railway wheels and tires such as those disclosed in U.S. Pat. No. 4,996,830 to Davison, the disclosure of which is herein incorporated by reference.

Figure 5:
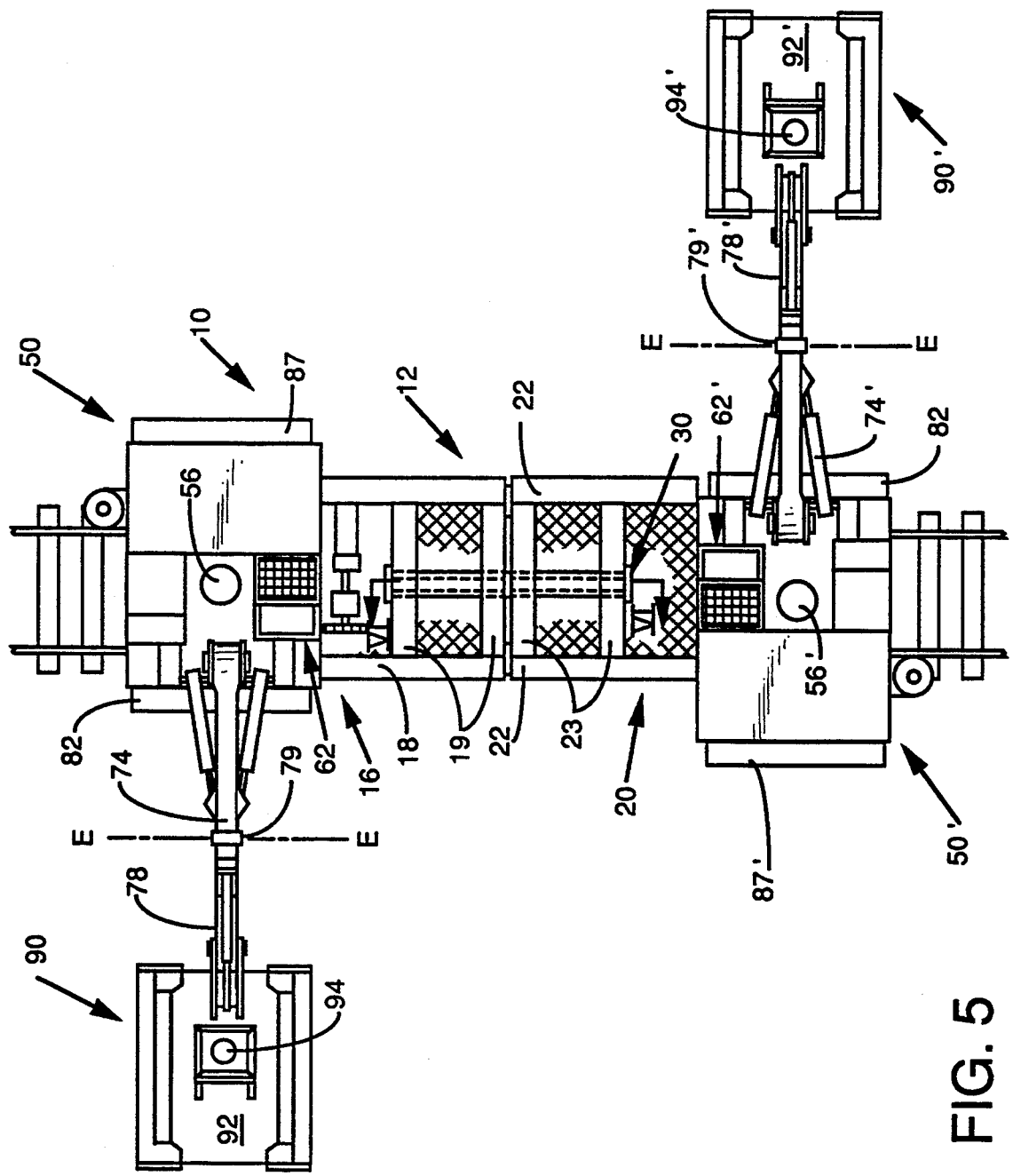
FIG. 5 is a plan view of a mobile vegetation cutting apparatus of the present invention with the boom assemblies thereof pivoted to opposite sides of the railroad tracks upon which it is riding.
Figure 6:
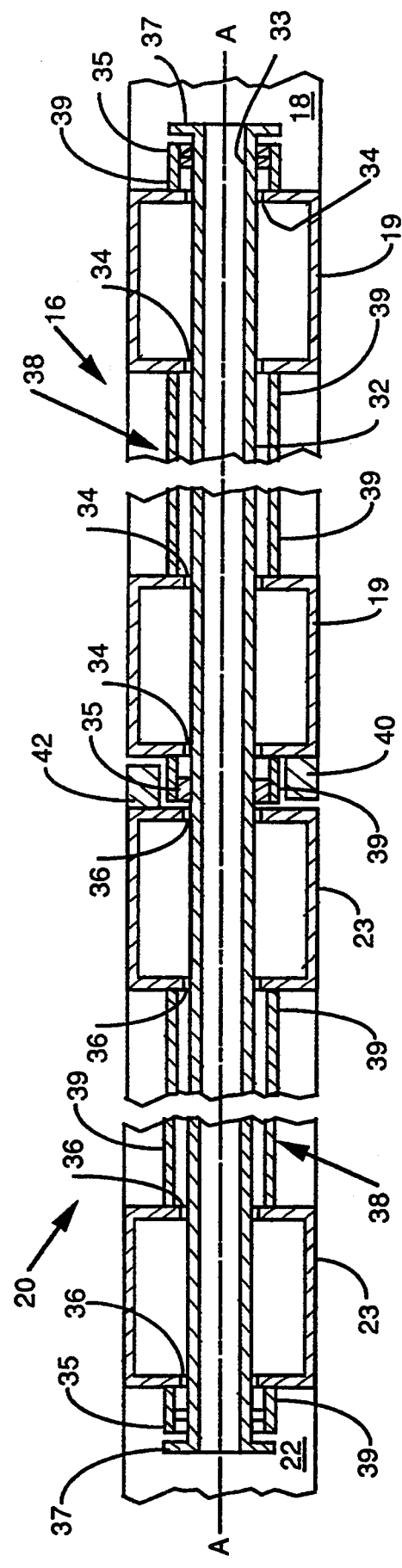
FIG. 6 is a partial cross-sectional view of the chassis of a mobile vegetation cutting apparatus of the present invention taken along line VI—VI in FIG. 5.
Figure 7:
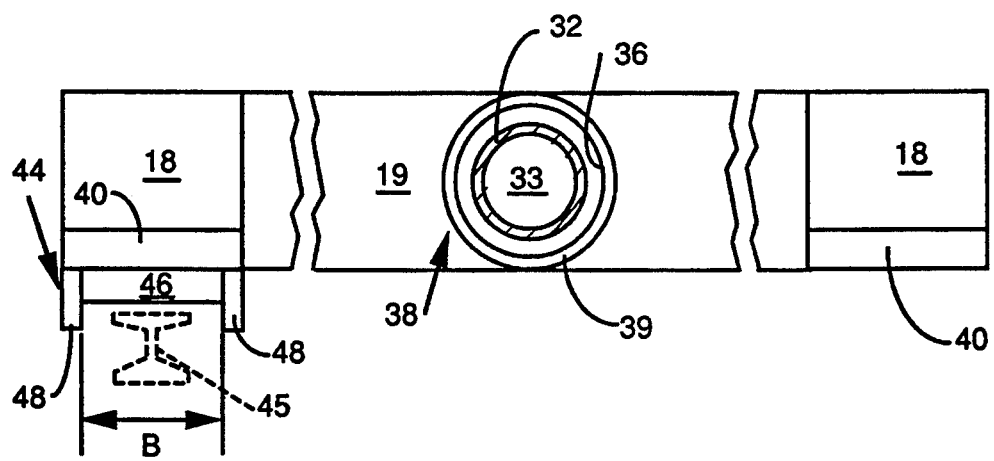
FIG. 7 is a partial cross-sectional view of the front chassis portion of the mobile vegetation cutting apparatus of the present invention taken along line VII—VII in FIG. 1.
Figure 8:
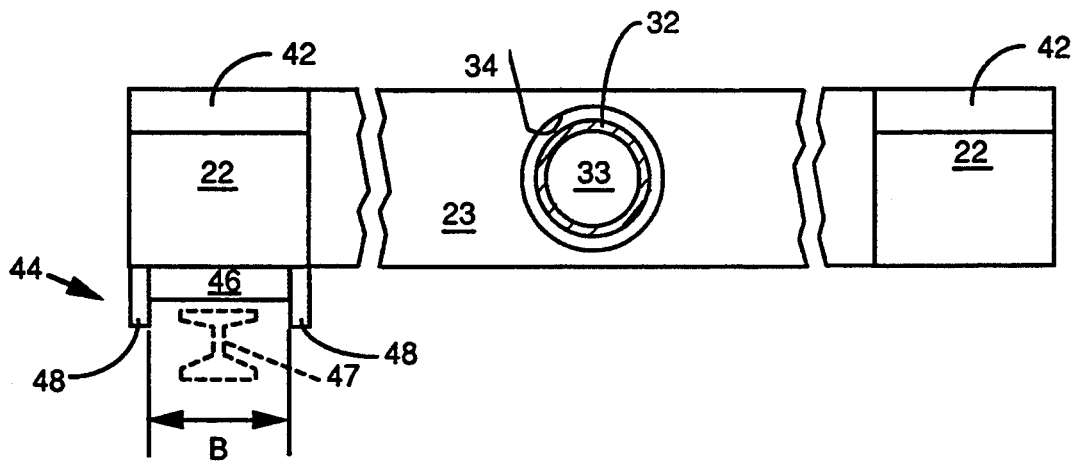
FIG. 8 is a partial cross-sectional view of the rear chassis portion of the mobile vegetation cutting apparatus of the present invention taken along line VIII—VIII in FIG. 1.

In the preferred embodiment, as can be most particularly seen in FIGS. 1, 2, and 5, the front chassis portion 16 and the rear chassis portion 20 are pivotally interconnected together by a pin assembly generally indicated as 30 that enables the front chassis portion 16 and the rear chassis portion 20 to pivot with respect to each other along axis "A—A". See FIG. 1. As can be seen in FIG. 6, the pin assembly 30 consists of a pin member 32 that extends through cross members 19 of the front portion 16 and cross members 23 of rear portion 18. As can be seen in FIGS. 6–8, pin member 32 rotatably extends through bores 34 provided in cross members 23 and bores 36 provided in cross members 19. Pin member 32 is also preferably rotatably housed within a cylindrical conduit generally indicated as 38. Cylindrical conduit 38, in its preferred form, consists of a plurality of conduit sections 39 that are welded to the cross members 19 and 23 as most particularly shown in FIG. 6. It will be understood that conduit 38 has an inner diameter that is larger than the outer diameter of pin member 32 to permit the pin member 32 to freely rotate therein.

In the preferred embodiment, the pin member 32 has an axial bore 33 extending therethrough that is adapted to facilitate passage of various hydraulic lines between the front chassis portion 16 and the rear chassis portion 20. In addition, pin member 32 is preferably rotatably supported within the conduit 38 by a plurality of bearings 35. See FIG. 6. Pin member 32 is also preferably equipped with end flanges 37 which serve to axially retain pin member 32 within the conduit 38. The skilled artisan will readily appreciate that the pin assembly 30 permits the front chassis portion 16 to pivot or flex with respect to the rear chassis portion 18 about axis "A—A" which serves to prevent the vehicle from accidental derailment due to uneven track conditions or during manipulation of the cutter mechanism supported thereon.

Figure 9:
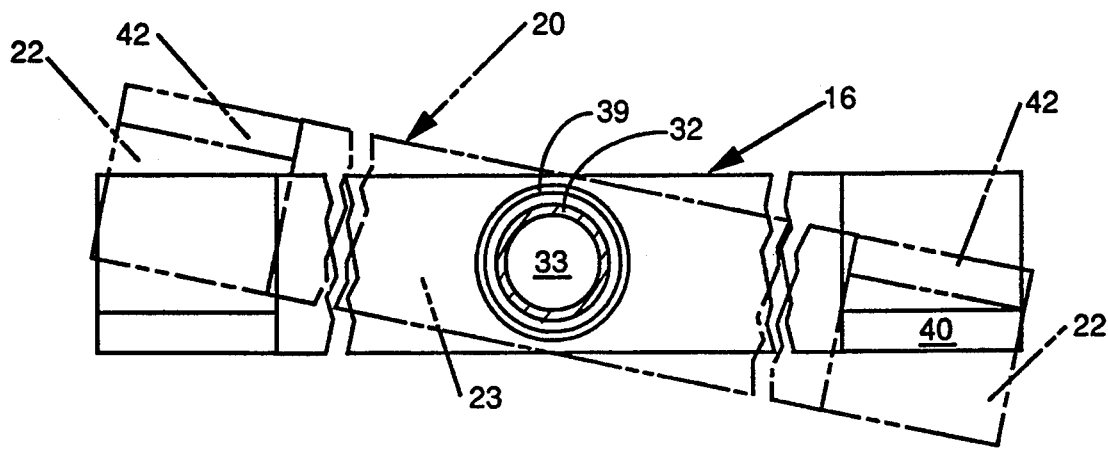
FIG. 9 is a partial cross-sectional view of the front chassis portion of the mobile vegetation cutting apparatus of the present invention taken along line VII—VII of FIG. 1 with the rear chassis portion, shown in broken lines, being pivoted to a second position.

The mobile vegetation cutting vehicle 10 of the present invention is also preferably equipped with means for limiting the pivotal travel of the front chassis portion 16 with respect to the rear chassis portion 20. Such apparatus comprises block members 40 and 42 mounted to the front chassis portion 16 and the rear chassis portion 20 as most particularly shown in FIGS. 6-9. As can be gleaned from reference to those Figures, blocks 40 are mounted, preferably by welding, to the ends of side members 18 of the front portion 16 as shown in FIG. 7. Similarly, blocks 42 are mounted, preferably by welding, to the ends of side members 22 as most particularly shown in FIG. 8. FIG. 9 illustrates the front chassis portion 16 with the rear chassis portion 20 (shown in broken lines) pivoted to a point wherein one of the blocks 40 on the front portion 16 has contacted a corresponding block 42 on the rear portion 20 to thereby limit the pivotal travel of the rear chassis portion 20 with respect to the front chassis portion 16. The skilled artisan will appreciate that the amount of pivotal travel of the front and rear chassis portions 16 and 20 with respect to each other can be adjusted to any desired amount by altering the mounting positions of the blocks 40 and 42.

As can be seen in FIGS. 2, 7, and 8, the front chassis portion 16 and the rear chassis portion 20 are also preferably equipped with rail stops 44 to prevent derailment of the apparatus 10. Rail stops 44, in their preferred form, have a cross member 46 and two downwardly extending side members 48. As can be seen in FIGS. 7 and 8, rail stops 44 are attached to the front chassis portion 16 and the rear chassis portion 20, preferably by welding, such that the side members 48 extend below the top portion of the rail (designated as 45 in FIG. 7 and 47 in FIG. 8). In the preferred embodiment, one rail stop 44 is attached to the front chassis portion 16 and one rail stop 44 is attached to the rear chassis portion 20 so that the rail stops 44 are located on diagonal corners of the chassis 12. Such arrangement permits the rail stop 44 that is mounted to the front chassis portion 16 to straddle rail 45 and the rail stop 44 that is mounted to the rear chassis portion 20 to straddle rail 47. It will be appreciated that such arrangement limits the lateral travel of the wheels 25 and 27 on the tracks 45 and 47 by virtue of contact between the downwardly extending side members 48 and the corresponding tracks. It will be further appreciated that the amount of lateral movement of the wheels 25 and 27 chassis 12 on the rails 45 and 47 can be limited by narrowing the distance "B" between the side members 48. The skilled artisan will also understand that rail stops 44 can, in the alternative, be attached to all four corners of chassis 12.

As mentioned above, the mobile vegetation cutting apparatus 10, in its preferred form, has drive units 50 and 50' rotatably supported thereon. In particular, a drive unit 50 is rotatably mounted to the front chassis portion 16 and a second drive unit 50' is rotatably mounted to the rear chassis portion 20. See FIGS. 1 and 2. In the preferred embodiment, the drive units 50 and 50' are identical in construction and, as such, only the construction of drive unit 50 will be herein described with it being understood that the like parts of drive unit 50' will be indicated by the "'" symbol on the Figures without being separately discussed herein.

Figure 3:
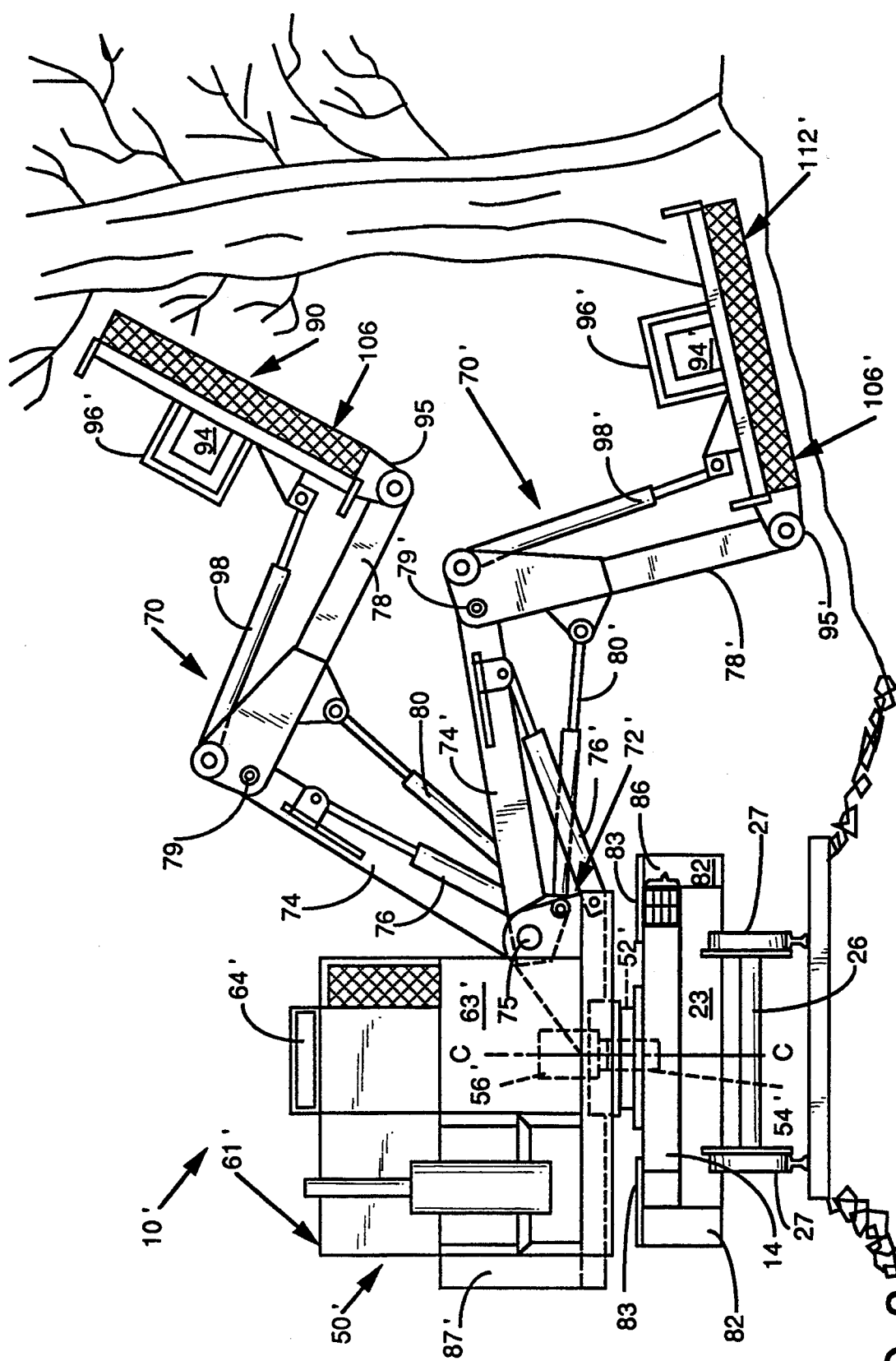
FIG. 3 is a front elevational view of the mobile vegetation cutting apparatus of FIG. 1 showing the cutting heads thereof at different angular orientations.
Figure 4:
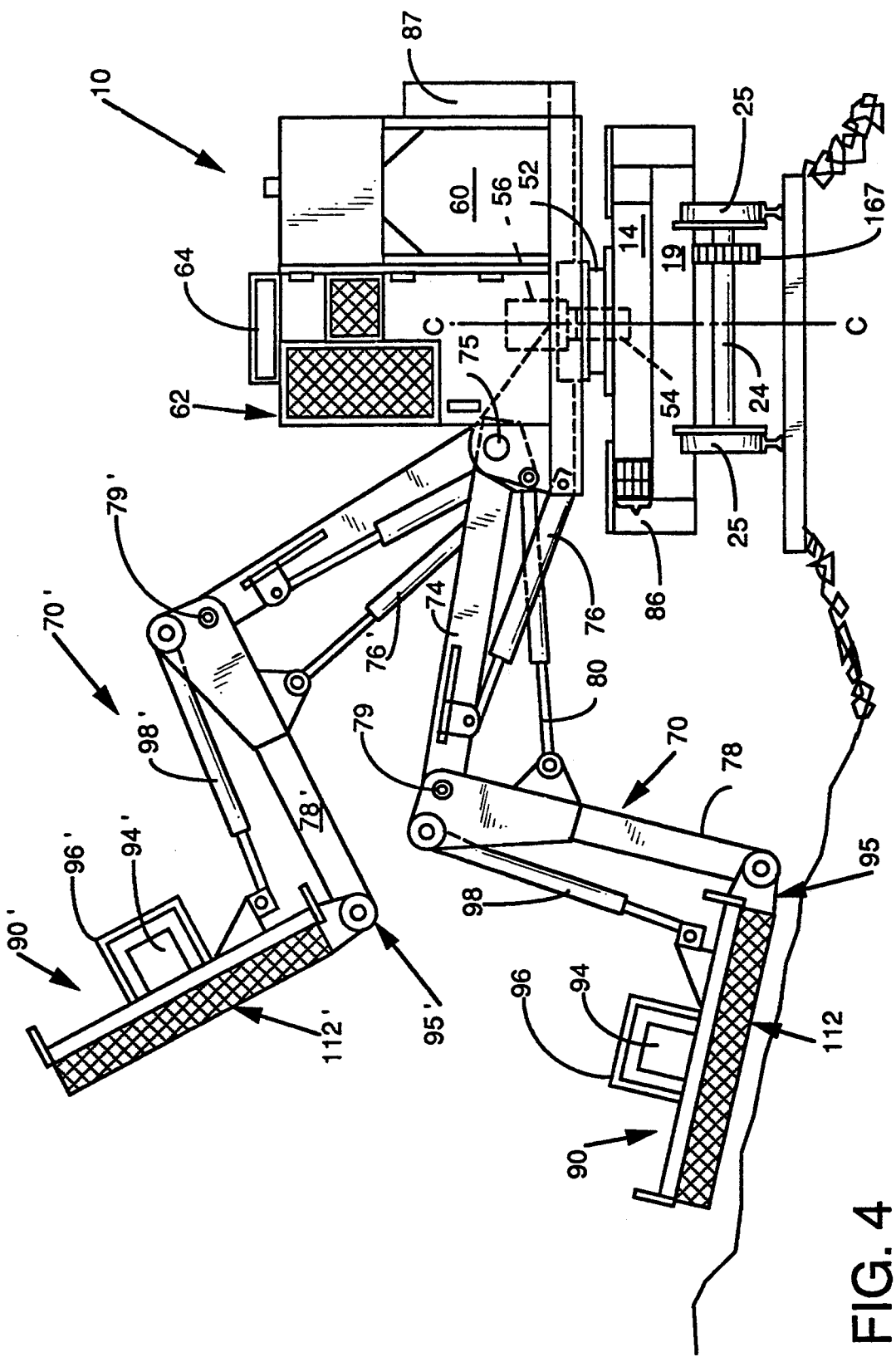
FIG. 4 is a rear elevational view of the mobile vegetation cutting apparatus of FIG. 1 with the cutting heads thereof each being pivoted to yet another position.

To facilitate rotatable attachment of the drive units (50, 50') to the chassis 12, an upper frame structure 14 is attached, preferably by welding, to the front chassis portion 16 and the rear chassis portion 20 as shown in FIG. 2. Drive units (50, 50') are each rotatably attached to one of the upper frame structures 14 by means of a well-known arrangement using a swing bearing (52, 52') through which passes a center pin (54, 54') such that the corresponding drive unit is rotatable with respect to the upper frame structure 14 by means of a corresponding hydraulic swing motor (56, 56'). See FIG. 1. As can be seen in FIGS. 2-4, the drive units (50, 50') can pivot in a 360 degree path about axis "C—C" which also corresponds to the centerline of the railroad tracks. It will be appreciated, however, that drive units (50, 50') can be mounted to chassis 12 in a variety of other orientations.

Drive units (50, 50') each have a frame member (58, 58') upon which is mounted an engine assembly (60, 60') and an operator cab (62, 62'). In a preferred embodiment, engines (60, 60') each consist of a Caterpillar 3208 Turbocharged 250 horsepower diesel powered engine. However, the skilled artisan will readily appreciate that other electrically powered or gasoline powered engines can be used. Mounted to the drive frames (58, 58') are fuel tanks (61, 61') and hydraulic control housings (63, 63'). The operator cab (62, 62') contains the operating controls for the corresponding drive unit (50, 50') and a corresponding boom assembly (70, 70') that is attached thereto. In the preferred embodiment, each operator cab (62, 62') is air conditioned by a conventional air conditioner (64, 64').

As mentioned above, in a preferred embodiment, a boom assembly (70, 70') is attached to a drive unit (50, 50'). The boom assembly (70, 70') is attached to the frames (58, 58') of the corresponding drive unit (50, 50') by a boom support cradle (72, 72') that is rigidly affixed to the frame member (58, 58'). The boom support cradle (72, 72') has a pair of spaced-apart upstanding support members (73, 73') between which the end of a first boom member (74, 74') is pivotally received. The first boom member (74, 74') is pivotally attached to the boom support cradle (72, 72') by a pin member (75, 75') in a known manner. Attached between the frame (58, 58') and the free end of the first boom member (74, 74') are preferably two extendable hydraulic cylinders (76, 76') that are adapted to swing the first boom member (74, 74') in an arc designated as "D" in FIG. 14.

Also attached to the free end of the first boom member (74, 74') is a second boom member (78, 78'). More specifically, a second boom member (78, 78') is pivotally attached to the free end of the first boom member (74, 74') by a pin (79, 79') in a known manner such that the second boom member (78, 78') can pivot about axis "E—E". See FIG. 5. The pivotal motion of the second boom member (78, 78') with respect to the first boom member (74, 74') is facilitated by an extendable hydraulic cylinder (80, 80') that is pivotally attached between one end of the first boom (74, 74') and the second boom (78, 78') in a known manner.

Figure 10:
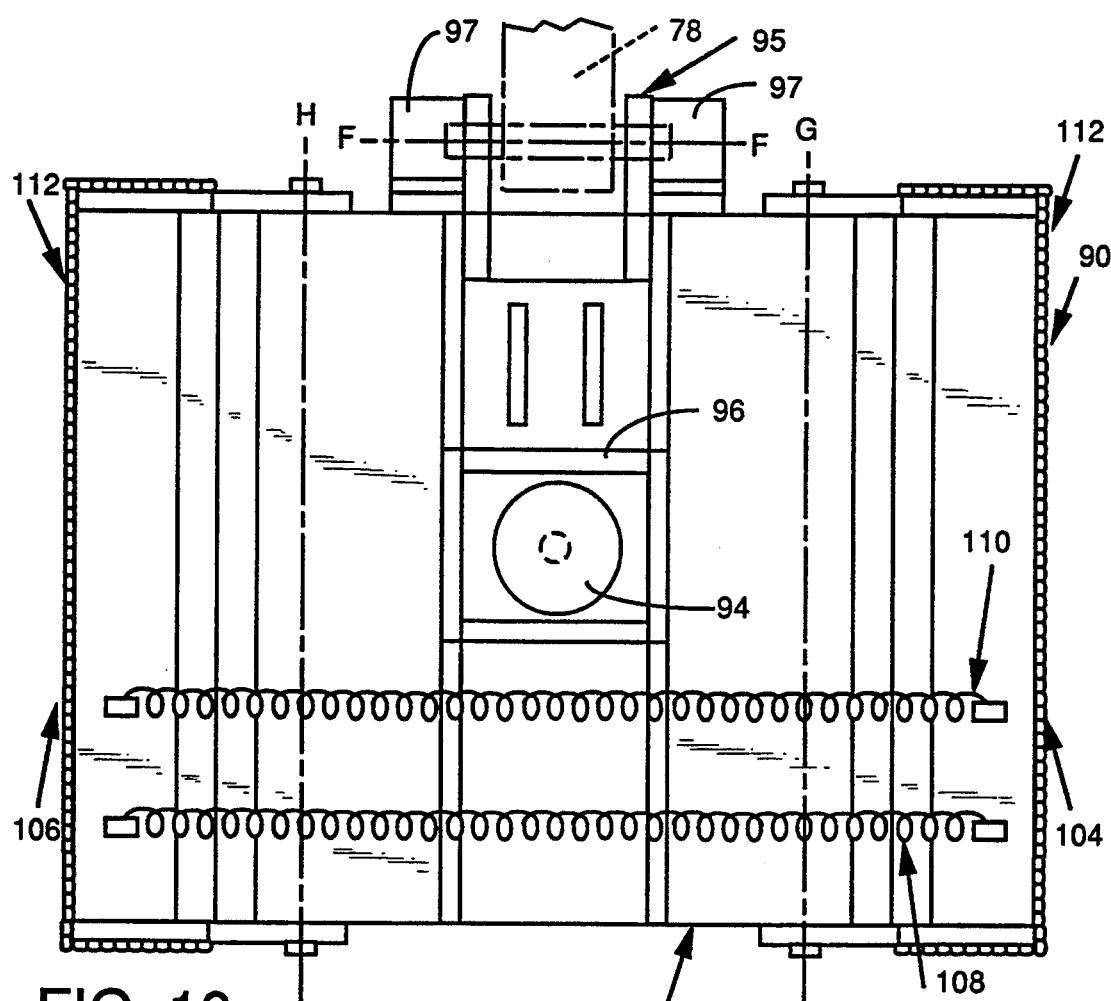
FIG. 10 is a plan view of the preferred cutting head assembly of the present invention.
Figure 11:
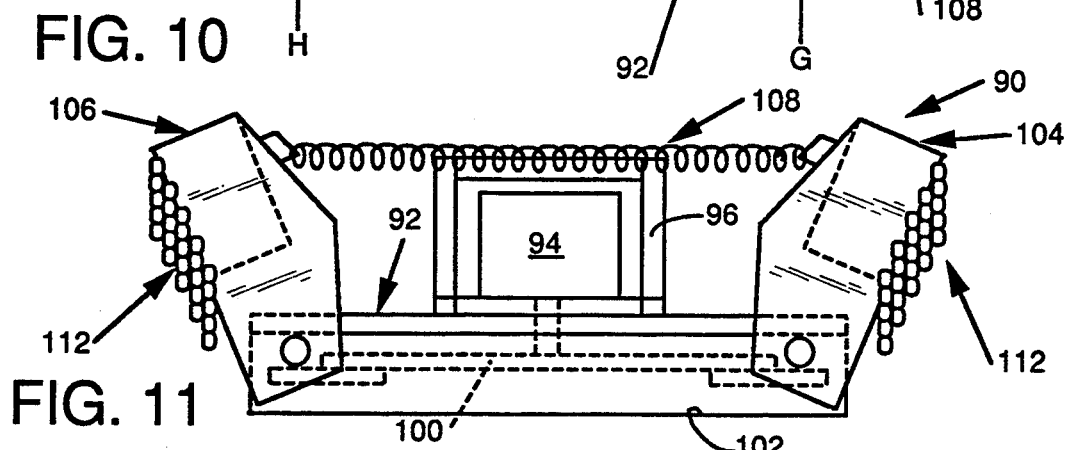
FIG. 11 is a front elevational view of the cutting head assembly of FIG. 10 with the door members thereof pivoted to an open position.
Figure 12:
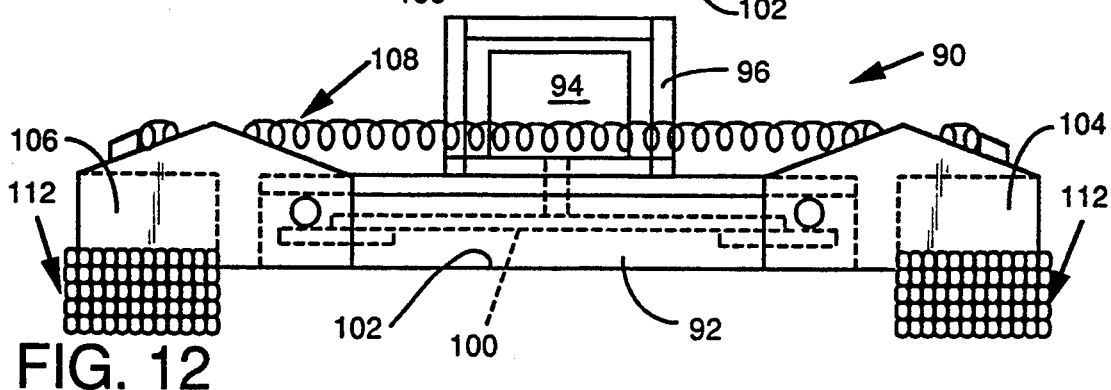
FIG. 12 is a front elevational view of the cutting head assembly of FIG. 10 with the doors thereof pivoted to a closed position.

Attached to the end of the second boom member (78, 78') is a cutting head assembly, generally indicated as (90, 90'). As can be seen in FIGS. 10–12, the cutting head assembly (90, 90') consists of a housing or deck member (92, 92') that supports a hydraulically powered blade motor (94, 94') thereon. In a preferred embodiment, a blade motor protection frame (96, 96') is mounted to the deck (92, 92') to protect the motor (94, 94') from falling branches and other debris.

The cutting head deck (92, 92') is pivotally attached to the end of the second boom member (78, 78') by a cradle member (95, 95'). See FIG. 10. In a preferred embodiment, the cradle member (95, 95') has two outwardly extending pads (97, 97') attached thereto. As will be further discussed below, the pads (97, 97') are adapted to engage the ground to thereby enable the operator to use the boom assemblies (70, 70') to maneuver the vehicle onto and off of the railroad tracks without damaging the cutting head assemblies (90, 90'). To pivot the cutting head assembly (90, 90') with respect to the end of the second boom member (78, 78'), an extendable cutting head cylinder (98, 98') is attached to the second boom member (78, 78') and the cutting head deck (92, 92') and is adapted to pivot the cutting head about axis "F—F". See FIG. 10.

Attached to the blade motor (94, 94') is a blade member 100 adapted to cut and mulch various forms of vegetation ranging from brush to small trees and limbs. See FIGS. 11 and 12. In a preferred embodiment, the cutting head assemblies (90, 90') are equipped with unique pivotal doors that permit vegetation to enter the cutting area, generally designated as 102 while preventing debris from being ejected from the cutting head assembly (90, 90'). More specifically and with reference to FIGS. 10–12, each cutting head assembly (90, 90') is equipped with front and rear entry doors (104, 104') and (106, 106'), respectively. The front door (104, 104') is pivotally attached to the deck (92, 92') and is adapted to pivot about axis "G—G". See FIG. 10. Similarly, the rear door (106, 106') is pivotally attached to the cutting head deck (92, 92') and is adapted to pivot about axis "H—H". Such arrangement permits the front and rear doors (104, 104') and (106, 106') to pivot between an open position (FIG. 11) and a closed position (FIG. 12). The reader will readily appreciate that, although FIGS. 11 and 12, depict the front door (104, 104') and the rear door (106, 106') as both being open and closed, respectively, front door (104, 104') and rear door (106, 106') can move independently from one another. It will be appreciated that when the doors (104, 104') and (106, 106') are in an open position, large vegetation such as trees and tree branches are permitted to enter the cutting area 102. After the large item of vegetation has entered the cutting area 102, the doors (104, 104') and (106, 106') move to a closed position, by virtue of their own weight, to thereby prevent debris from being discharged during the cutting process.

The cutting head deck (92, 92') and the front and rear doors (104, 104') and (106, 106') are preferably fabricated from heavy duty steel plate that can withstand the impact flying debris and the like without substantially deforming. To assist the front and rear doors (104, 104') and (106, 106') in opening, I prefer to fasten at least one, and preferably two, tension springs (108, 108') and (110, 110') between the front door (104, 104') and the rear door (106, 106') as most particularly illustrated in FIG. 10. It will be understood that the springs (108, 108') and (110, 110') assist the doors (104, 104') and (106, 106') to pivot to an open position when contacted by a large item of vegetation such as a tree. The springs (108, 108') and (110, 110') are preferably sized such that they are unable to retain doors (104, 104') and (106, 106') in the open position when they are no longer contacted by the tree. Also, in a preferred embodiment, portions of chain link guard members (112, 112') are attached to each door (104, 104') and (106, 106') to further prevent debris from being ejected from the cutting head assembly (90, 90') during the cutting process.

Figure 13:
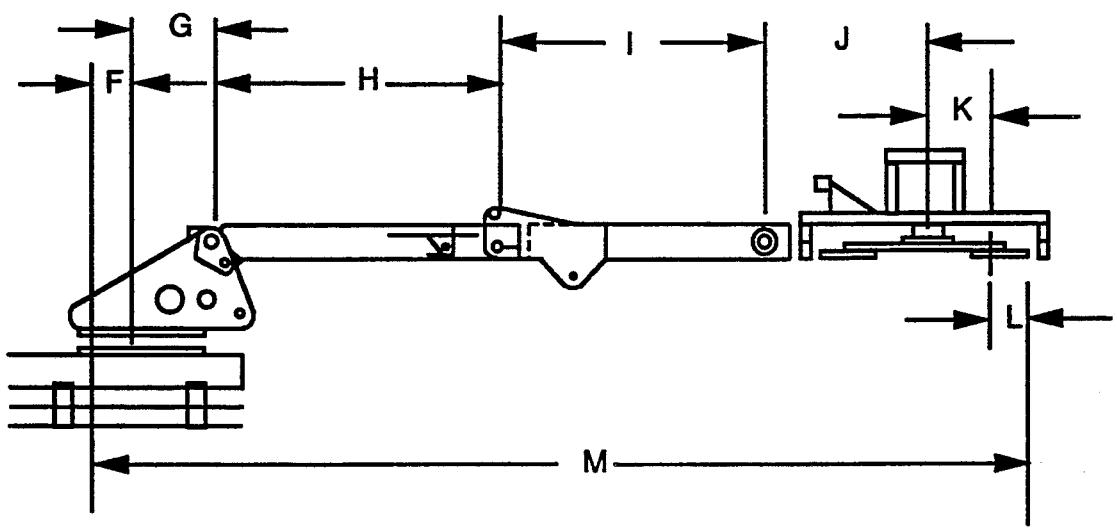
FIG. 13 is a side elevational view of a preferred boom and cutting head assembly of the present invention.
Figure 14:
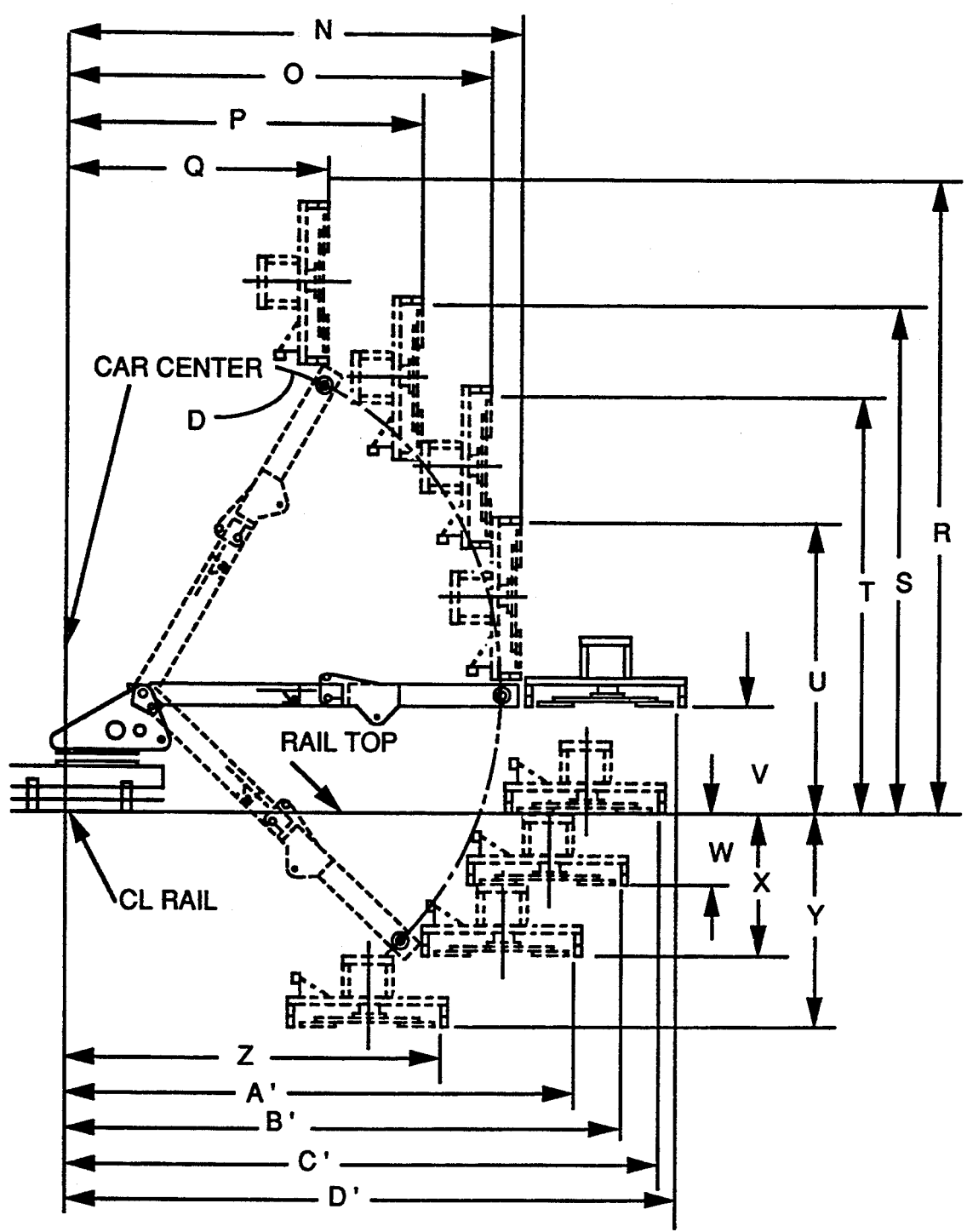
FIG. 14 is a side elevational view of the boom and cutting head assembly of FIG. 13 pivoted to a variety of different orientations.

By way of example only, the unique reach capabilities of the boom assemblies (70, 70') of the present invention are illustrated in FIGS. 13 and 14. In particular, FIG. 13 depicts a boom assembly (70, 70') that has the following dimensions: "F"=1'; "G"=2'; "H"=9'; "I"=8'; "J"=4'-8"; "K"=2'-2"; "L"=1'-2"; and "M"=28'. FIG. 14 illustrates a sample of the various configurations that may be assumed by the boom assembly (70, 70') that has the above mentioned dimensions. The distances depicted in FIG. 14 are as follows: "N"=20'-5"; "O"=19'-1"; "P"=16'-8"; "Q"=12'-1"; "R"=28'; "S"=24'; "T"=20': "U"=13'-4"; "V"=4'-11"; "W"=3'; "X"=6'; "Y"=8'-10"; "Z"=17'-11"; "A'"=24'-1"; "B'"=26'; "C'"=27'-3"; and "D'"=28'. It will of course be appreciated that the various components comprising the boom assemblies (70, 70') and the cutter head assemblies (90, 90') can be provided in a myriad of other dimensions and sizes and, as such, the foregoing should be viewed as depicting but one of many boom assembly configurations and should not, in any way, be construed as limiting the scope of the present invention. The skilled artisan will further appreciate, however, that the distance "E" between the centerlines of the drive units (50, 50') must be large enough to permit the drive unit (50, 50') and the boom assembly (70, 70') attached thereto to pivot in a 360 degree path about axis "C—C" as shown in FIG. 2, if so desired.

Figure 15:
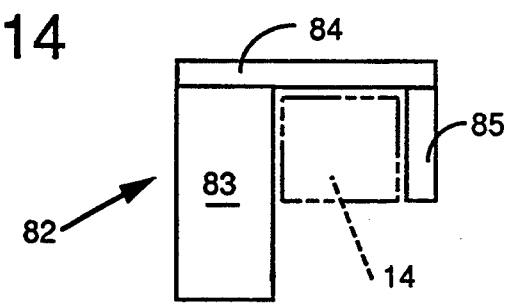
FIG. 15 is a side elevational view of one of the preferred counterweight assemblies of the present invention.

To enable the boom assemblies (70, 70') and the cutting head assemblies (90, 90') to assume a variety of different orientations, such as the ones described above without causing the apparatus 10 to tip over, a unique counterweighting system is preferably utilized. In particular, as can be seen in FIGS. 5 and 15, counterweights 82 are attached to two diagonal corners of the chassis 12. In the preferred embodiment, counterweights 82 each consist of a downwardly extending steel side plate 83 and upper horizontal plate 84 and a downwardly extending retainer plate 85 assembled, preferably by welding, in the configuration illustrated in FIG. 15. In a preferred embodiment, each counterweight 82 weighs approximately 2400 pounds. Such configuration enables the counterweight 82 to be removably hooked over the upper structure 14 as illustrated in FIGS. 3, 4, and 15. In addition, as most particularly shown in FIGS. 3 and 4, additional counterweight material 86, in the form of steel plates collectively weighing approximately 1300 pounds) are received in the ends of each upper structure 14 and are retained therein preferably by bolts (not shown).

I also prefer to removably attach counterweights (87, 87') to the rear of each drive unit (50, 50') as most particularly illustrated in FIG. 2. The counterweights (87, 87') each preferably weigh approximately 5400 pounds and have two cradles (88, 88') formed therein that are adapted to receive the corresponding cross struts (59, 59') of frame member (58, 58'). The counterweights (87, 87′) are also preferably bolted to the drive unit (50, 50′) by bolts (not shown). As such, the above described counterweight system permits the boom assemblies (70, 70′) to be independently pivoted to either side of the chassis 12 without tipping the chassis 12 off of the railroad tracks. The skilled artisan will readily appreciate, however, that the weights of the counterweights recited above, are given by way of example only. The amount of counterweights required will depend upon, for example, where the drive units (50, 50′) are mounted with respect to the center of gravity of the chassis 12 and the length, weight, and range of travel of the components comprising the boom assemblies (70, 70′) and the cutting head assemblies (90, 90′).

Figure 16A:
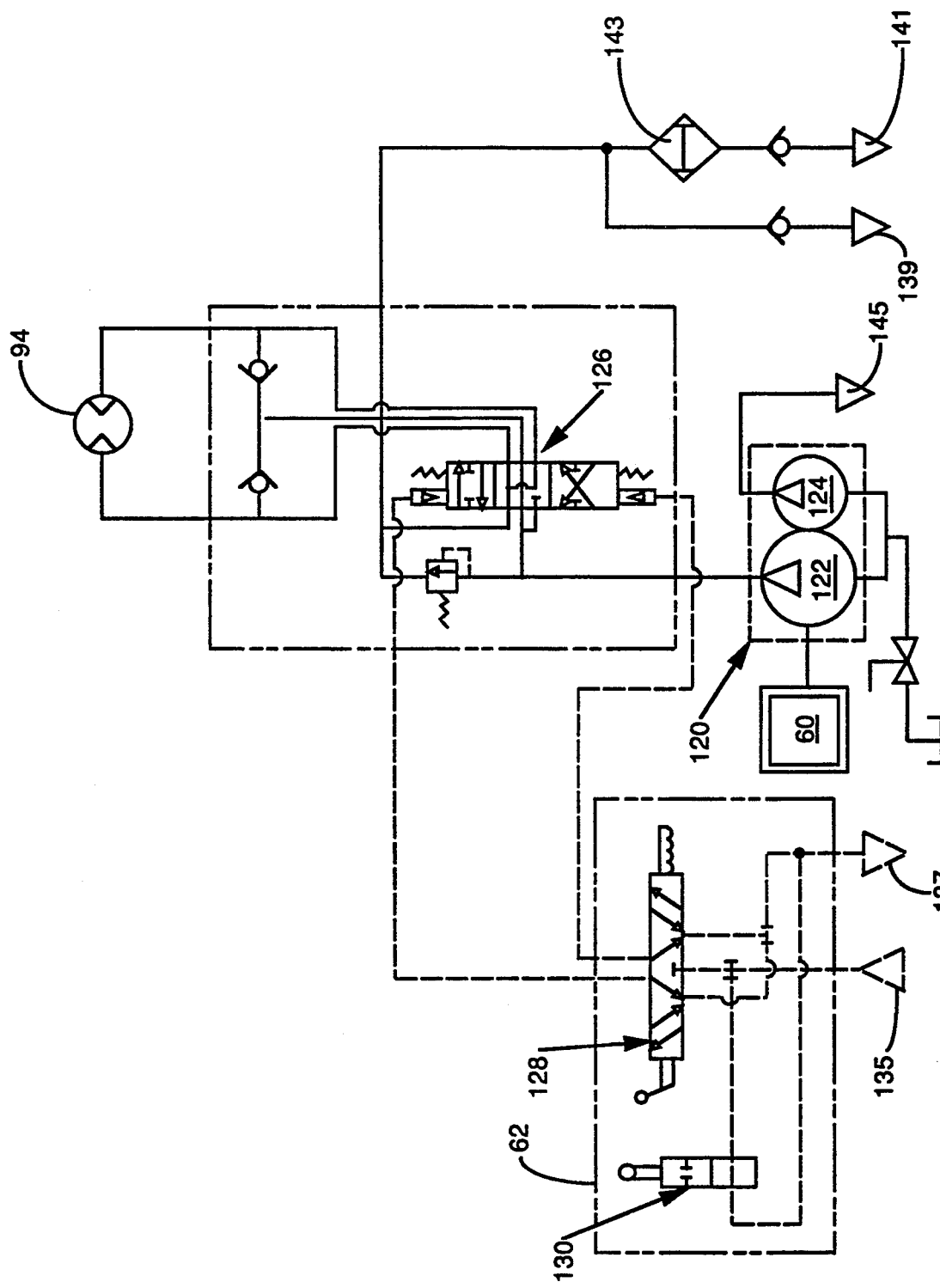
FIG. 16A is a partial schematic of a hydraulic system of one of the drive units of the present invention.
Figure 16B:
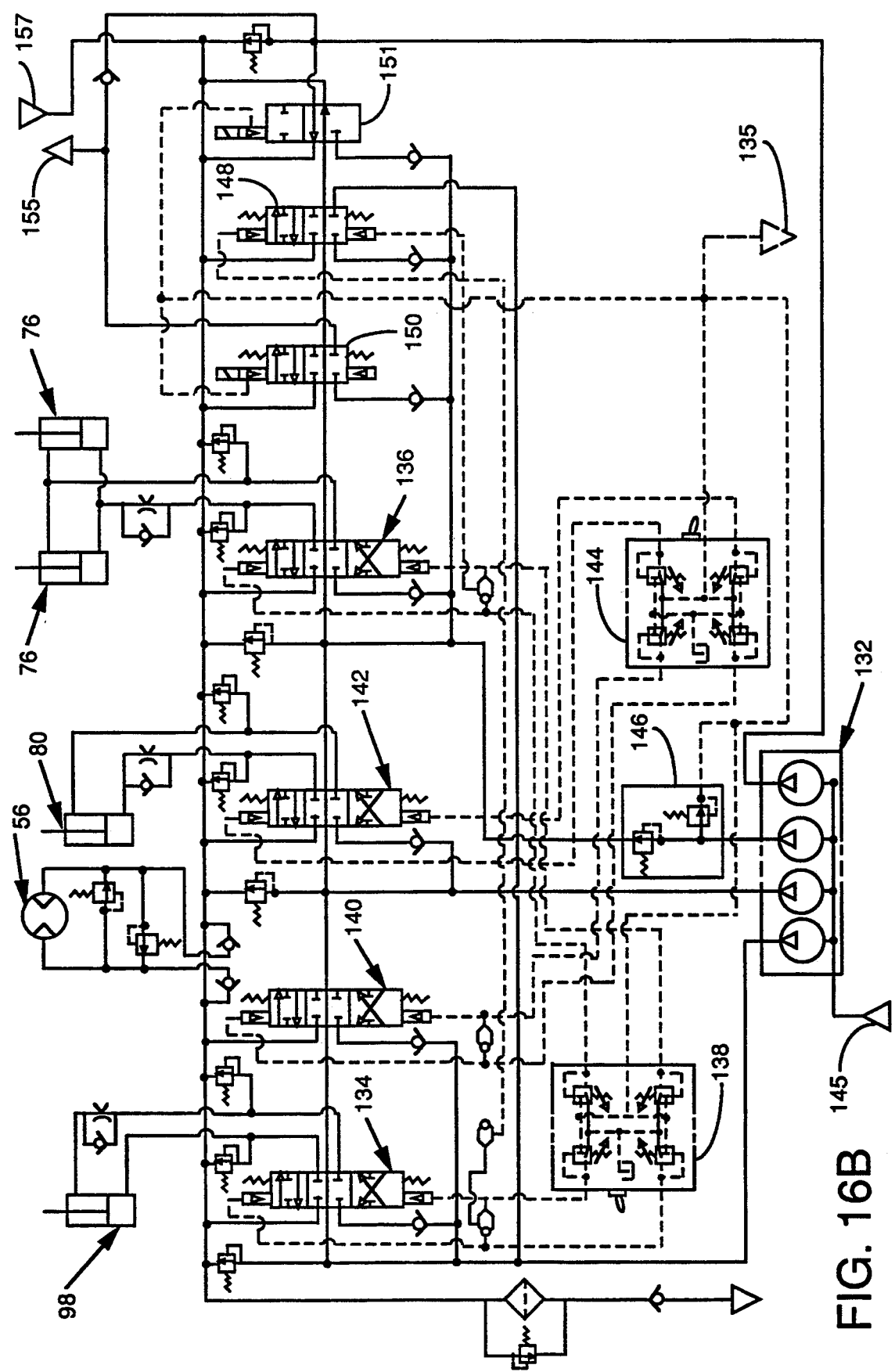
FIG. 16B is a partial schematic of the hydraulic system of FIG. A.
Figure 16C:
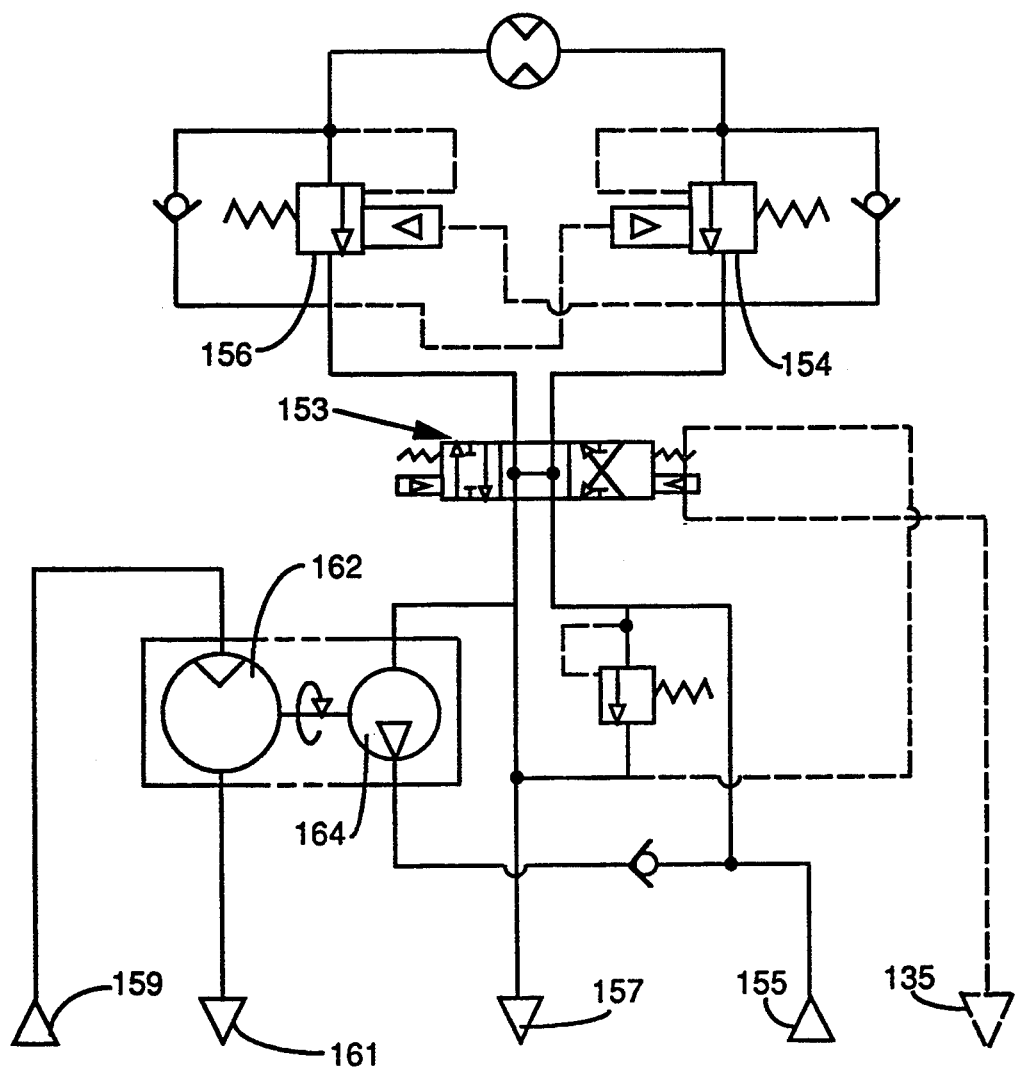
FIG. 16C is a partial schematic of the hydraulic system used to control the traction motor of the present invention, to be viewed in connection with FIGS. 16A and 16B.

FIGS. 16A-C, illustrate the hydraulic schematic of outlined representations of related components of the drive unit 50 for controlling the operation of the boom assembly 70 attached thereto and for providing power to the drive assembly for propelling the apparatus 10 along the railroad tracks. The reader will appreciate that hydraulic control system for drive unit 50′ is substantially identical to the hydraulic control system for drive unit 50 and, as such, will not be separately described herein.

Turning first to FIG. 16A, the engine 60, as was described above, provides power for driving the apparatus 10 along the railroad tracks and for operating the boom and cutting apparatuses attached to the drive unit 50. More specifically, engine 60 provides rotational power to a hydraulic pump unit 120 by known methods. Hydraulic pump unit 120 is preferably a two section unit. A first pump section 122 pumps hydraulic driving fluid directly to a cutter control valve 126 which, when cutting is authorized by an operator control valve 128 (located in cab 62 and supplied with pilot fluid through conduit 135), causes hydraulic fluid to flow to the hydraulically powered blade motor 94. The hydraulic fluid is returned to the reservoir (not shown) through conduits 139 and 141. As can be seen in FIG. 16A, conduit 141 is preferably equipped with a conventional filter 143.

In the preferred embodiment, a conventional spring actuated door switch 130 (mounted to the operator cab 62) is fluidly connected to operator control valve 128 and cooperates therewith in a known manner to prevent hydraulic fluid from being supplied to hydraulic motor 94 when the door to the operator cab 62 is open. As such, to supply hydraulic fluid to the motor 94, the door to the operator cab 62 must be closed. When the door is open, door switch 130 permits the hydraulic fluid to return to the hydraulic fluid reservoir (not shown) through line 137.

The second pump section 124 pumps hydraulic fluid through conduit to a flow divider 132 to provide hydraulic power to various hydraulically powered components of the boom and cutter assemblies 70 and 90 and to the traction motor 168. See FIG. 16B. Flow divider 132 is basically a hydraulic motor having a common drive shaft and different width gears intended to provide four discrete hydraulic fluid outputs. Such outputs provide hydraulic fluid under pressure for use in, among other things, powering, under the control of an operator in cab 62: (1) the cylinder 98 which pivots the cutting deck with respect to end of the second boom member 78; (2) the hydraulic swing motor 56 for pivoting the drive unit 50 with respect to the chassis 12; (3) the cylinder 80 for pivoting the second boom member 78 with respect to the first boom member 74; (4) the cylinders 76 for pivoting the first boom member 74 with respect to the drive unit 50; and (4) the traction motor 168 for driving the apparatus 10. While the powering of the items listed immediately above may be accomplished by means of separate hydraulic pumps, in the present apparatus such functions may be powered by hydraulic outputs from flow divider 132 by means known to the skilled artisan.

As can be seen in FIG. 16B, divider 132 supplies hydraulic fluid to a hydraulically operated control valve 134 that controls the supply of hydraulic fluid to cylinder 98 that pivots the cutting head assembly 90 with respect to the end of the second boom member 78. Similarly, divider 132 supplies hydraulic fluid to a hydraulically operated control valve 136 that controls the supply of hydraulic fluid to the cylinders 76 that control the pivotal motion of the first boom member 74. Control valves 134 and 136 are controlled by a conventional first joy stick assembly, generally indicated as 138, that is located in the operator cab 62.

Divider 132 similarly supplies hydraulic fluid to a hydraulically operated control valve 140 that controls the supply of hydraulic fluid to hydraulic swing motor 56. Divider 132 also supplies hydraulic fluid to a hydraulically operated control valve 142 that controls the supply of fluid to cylinder 80 which controls the pivotal motion of the second boom member 78. Control valves 140 and 142 are controlled by a second conventional joy stick assembly, generally indicated as 144, located in the operator cab 62. Divider 132 also supplies hydraulic fluid to a pilot valve 146 that supplies hydraulic "pilot" fluid to the joy stick assemblies 138 and 144 and to other component control valves through line 135 in a manner known to those of ordinary skill in the art.

Turning now to FIGS. 16A and 16C, divider 132 supplies hydraulic driving fluid to speed control valves 148, 150, and 151 (see FIG. 16A), which, depending upon the travel speed desired, can cause hydraulic fluid to be admitted through conduit 152 to a directional travel control valve 153 (see FIG. 16C). More specifically, a preferred mobile vegetation cutting apparatus of the present invention can preferably be driven along the tracks or a discrete pathway at two speeds, a slower or cutting speed and a travel speed that is faster than the cutting speed. The attainment and control of the slower speed or cutting speed will now be described.

When operating at the cutting speed, it will be understood that divider 132 is not only supplying hydraulic fluid to the traction motor 168 but also to the various boom and cutting head control cylinders described above. As such, there is less power available from engine 56 to power the traction motor 168. To power the traction motor 168 at the cutting speed, hydraulic fluid is supplied from the divider 132 to a conventional solenoid operated control valve 148. When authorized by the operator in cab 62, the hydraulic fluid passes from the control valve 148 through conduit 155 to a conventional directional control valve 153 that is used to select the conduit through which the fluid is permitted to pass to the traction motor 168. It will be appreciated that control valve 152, by virtue of controlling the direction in which the fluid is supplied to the traction motor 168, controls the rotational direction of the traction motor 168 and, ultimately, the direction in which the apparatus 10 travels.

In the faster travel mode, wherein hydraulic fluid is not being supplied to the various components of the drive unit 50 and cutting head assembly 70, the hydraulic fluid passing through line 157 can be used to power the traction motor 168. In addition, divider 132 supplies hydraulic fluid to conventional solenoid operated control valves 150 and 151 (see FIG. 16A) which, when authorized by the operator in cab 62, permit hydraulic fluid to flow through the conduit 155 to the directional control valve 152. I have found that such arrangement permits travel speeds up to three times the normal cutting speeds to be attained with this system. The skilled artisan will appreciate, however, that a variety of different speeds may be attained by varying the above-mentioned component sizes and arrangements.

In a preferred embodiment, as illustrated in FIG. 16C, two conventional pilot assisted braking valves 159 are used to decelerate the traction motor 168 when the control valve 153 is shifted to the neutral position. The braking valves 159 are spring actuated and when the pressure of the fluid exiting the traction motor 168 falls below a preset pressure, the braking valve 159 communicating with that line will, by virtue of its spring actuator, close to thereby introduce a back pressure to the spinning traction motor 168 thus causing the traction motor 168 to decelerate.

As mentioned above, drive unit 50' has a hydraulic system that is substantially identical to the hydraulic system of drive unit 50 that was described immediately above with the exception of the means by which the engine 56' supplies power to hydraulic traction motor 168. It will be understood, however, that the hydraulic system for the drive unit 50', although substantially identical to the hydraulic system for the drive unit 50, is, nevertheless, a separate discrete system. The hydraulic fluid in the hydraulic system for the drive unit 50' preferably never mixes with the hydraulic fluid found in the hydraulic system for the drive unit 50. Therefore, to enable hydraulic power to be transmitted from the engine 56' to the traction motor 168, a motor and hydraulic pump assembly, generally indicated as 160 in FIG. 16C, is used.

More specifically, the hydraulic system for the drive unit 50' is also equipped with speed control valves 148' and 150' that are configured, supplied, and controlled in the manner described above for control valves 148 and 150. When authorized by the operator in cab 62', hydraulic fluid is passed from control valve 148' through conduit 159 to hydraulically powered motor 162. Conduit 161 returns the fluid to the lines (not shown) supplying the control valve 148'. Motor 162 is mechanically connected to hydraulic pump 164 which fluidly communicates with lines 155 and 157 as shown in FIG. 16C. It will therefore be understood that by supplying hydraulic fluid to hydraulic motor 162 from control valve 148', pump 164 is caused to further pump the hydraulic fluid found in lines 155 and 157 to the directional control valve 152 and ultimately to the traction motor 168.

The skilled artisan will appreciate that the above-described hydraulic systems enable both engines (56, 56') to supply power to the traction motor 168. It will be further appreciated, however, that should one engine (56, 56') become disabled, the remaining engine can be used to power the traction motor 168 in the desired direction.

As can be seen in FIGS. 1 and 2, the traction motor 168 is preferably equipped with a gear box 162 that is mechanically interconnected to conventional planetary gears 164. Planetary gears 164 provide a mechanical output to a sprocket 165 which transmits power by means of a chain 166 that is received on a corresponding sprocket 167 that is attached to the front axle 24. While the present apparatus, in its preferred form, is self-propelled in the manner described above, the skilled artisan will also readily appreciate that the apparatus 10 may be fabricated without a traction motor 168 and, thus, be configured to be towed by another mobile vehicle adapted to ride upon the railroad tracks.

Figure 17:
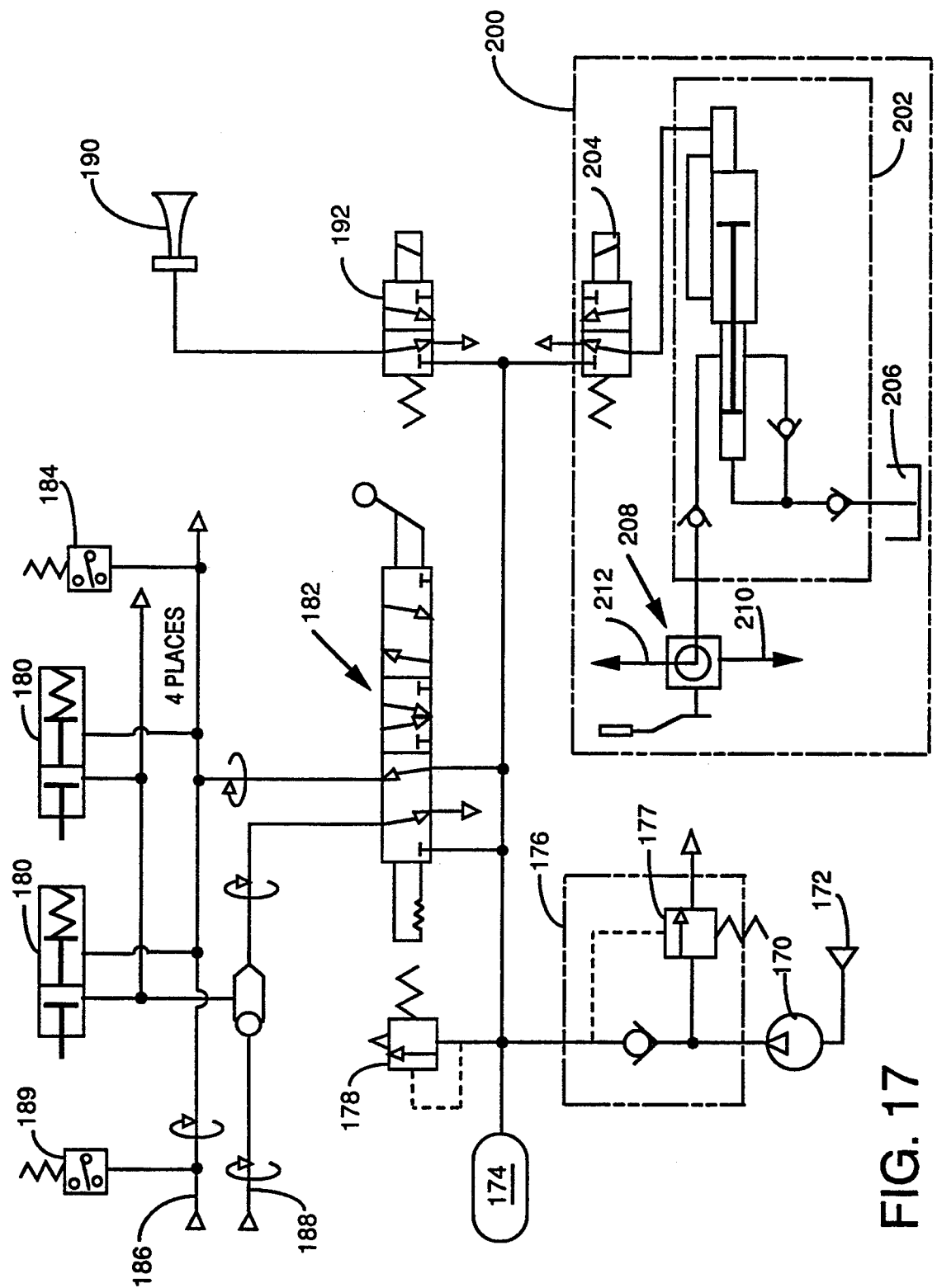
FIG. 17 is a schematic of an air system of one of the drive units of the present invention.

In a preferred embodiment, each drive unit (50, 50') is also equipped with substantially identical but discrete pressurized air systems. The air system for the drive unit 50 will now be described with it being understood that the air system for drive unit 50' is preferably similarly configured. As can be seen in FIG. 17, compressed air is supplied by a compressor 170 that is powered by engine 56. Preferably, air is drawn into compressor 170 through a filter 172, preferably 25 micron in size, to prevent the air system from becoming contaminated with airborne dirt. The compressor 170 compresses air which is sent to a receiver 174 adapted to store the air therein for use as needed by the air powered components of the system. In a preferred embodiment, a conventional unloader 176 is provided. The unloader contains, among other things, a relief valve 177 that serves to permit the compressor output to be vented to atmosphere when the system has no further need for compressed air. In addition, a relief valve 178, set at a predetermined threshold pressure, is provided to vent the system should an unsafe pressure be attained within the system.

As can be seen in FIG. 17, the compressor 170 supplies air for a variety of different air operated components. For example, air is supplied to air actuated friction brakes schematically depicted as components 180 in FIG. 17. Friction brakes 180 are preferably mounted to each wheel 25 and 27 and are operated by brake control valve 182 located in the cab 62. As such, when authorized by the operator in cab 62, brake control valve 182 permits air to pass from receiver 174 to the brakes 180. In a preferred embodiment, brakes 180 are conventional friction brakes that are also equipped with spring actuated pads that are brought to bear against the wheel or axle if control air is lost thereto. Also, in a preferred embodiment, the air system is equipped with a conventional pressure sensing switch 184 that electrically communicates with an indicator light (not shown) in the cab 62 to inform the operator that the brakes 180 are not being supplied with air and, thus, are engaged.

The above mentioned air braking system can also be controlled by the operator located in cab 62' in the same manner as was immediately described above. Under that mode of operation, air is supplied to the brakes 180 through conduits 186 and 188 that are fluidly connected to air system of drive unit 50'. In a preferred embodiment, a second pressure switch 189, that senses the air pressure in conduit 186, communicates with an indicator light (not shown) in the cab 62' to inform the operator in cab 62' as to whether the brakes 180 are engaged.

As can further be seen in FIG. 17, the air system of drive unit 50 also includes an air operated horn 190. In particular, air is supplied to a solenoid controlled valve 192, which, when authorized by the operator in the cab 62, permits air to flow to the horn 190. In a preferred embodiment, the control valve 192 is electrically operated by a switch (not shown) located in one of the joy sticks in the cab 62.

Also in a preferred embodiment, each drive unit is equipped with a herbicide spraying system, generally indicated as 200. The herbicide spraying system preferably consists of an air operated reciprocating pump 202 that is controlled by a solenoid operated control valve 204. Solenoid control valve 204, when authorized by the operator in cab 62 by means of a switch (not shown), permits air to pass to the pump 202 which causes pump 202 to pump herbicide from herbicide storage tank 206. The pump 202 pumps the herbicide from the tank 206 to a manually operated conventional selector valve 208 mounted on the cutting head deck 92. Fluidly attached to the selector valve 208 are spray nozzles 210 and 212 that are also mounted to cutting head deck 92. In a preferred embodiment, the spray nozzle 110 is oriented to spray herbicide from one lateral side of the deck 92 and the other spray nozzle 112 is oriented to spray from the other lateral side of deck 92. It is desirable to spray the herbicide from the trailing end of the deck 92 onto the cut vegetation and, depending upon the direction of travel of apparatus 10, selector valve 208 permits the operator to select which nozzle 210 or 212 to use.

With respect to the general operation of the vehicle 10, the cabs (62, 62') are preferably each occupied by an operator during movement of the vehicle along the railroad tracks, when cutting and not cutting. When it is desired to cut vegetation adjacent to the railroad tracks on both sides of the tracks or on opposite sides of the tracks, each operator controls and manipulates the boom assembly (70, 70') and the cutting head assembly (90, 90') that is attached to his cab (62, 62') in a manner known in the art. As was discussed above, each drive unit (50, 50') can supply power to the traction motor 168 and thus the driving of the apparatus 10 can be controlled by either operator.

The apparatus 10 can be unloaded directly onto the railroad tracks by known vehicle-carrying loaders adapted to transport a vehicle on the highway. In the alternative, the apparatus 10 can be unloaded adjacent to the railroad tracks and then maneuvered thereon by utilizing the boom assemblies (70, 70') in a coordinated manner to raise and maneuver the vehicle 10 onto the railroad tracks. In particular, the ends of the second boom members (78, 78') can be brought to bear with the ground surface to cause the vehicle to be lifted to a height wherein the wheels 25 and 27 can clear the top of the railroad tracks. It will be appreciated that when utilizing the boom assemblies (70, 70') in that manner, the corresponding cutting head assemblies (90, 90') are pivoted to a position wherein they do not contact the ground. Instead, the cradle pads (97, 97') serve to support the end of the second boom member (78, 78') on the ground surface thereby protecting the end of the second boom member (78, 78') and the corresponding cutting head assemblies (90, 90') attached thereto.

The reader will appreciate that the mobile vegetation cutting apparatus 10 can be utilized to cut vegetation simultaneously on both sides of a discrete pathway at different elevations and angles while traveling therealong. In addition, the present apparatus 10 can simultaneously cut vegetation at various elevations and angles on the same side of a discrete pathway while traveling therealong. The preferred form of the apparatus 10 is also provided with a unique two piece flexible chassis that permits one chassis portion to pivot with respect to the other chassis portion in order to compensate for track irregularities. In addition, the apparatus 10 also employs means for limiting the lateral travel of the chassis wheels while traveling on the tracks.

The present invention is also equipped with means for selectively spraying herbicide onto the vegetation adjacent the pathway. The present invention also employs a unique guarding system for permitting large items of vegetation to be cut or mulched by a cutting assembly while simultaneously substantially preventing the debris from such cutting or mulching operation from being uncontrollably ejected therefrom.

Accordingly, the present invention provides solutions to the aforementioned problems associated with prior known methods and apparatuses used to cut vegetation along discrete pathways such as railroad right-of-ways. It will be understood, however, that various changes in the details, materials and arrangements of parts which have been herein described and illustrated in order to explain the nature of the invention may be made by those skilled in the art within the principle and scope of the invention as expressed in the appended claims.

What is claimed is:

1. Apparatus for cutting vegetation comprising:
    a mobile chassis;
    at least two boom assemblies pivotally attached to said mobile chassis, each said boom assembly being selectively pivotable to a plurality of vegetation cutting positions on both lateral sides of said mobile chassis; and
    cutting means attached to each said boom assembly.

2. The apparatus of claim 1 wherein said mobile chassis comprises:
    a first chassis portion; and
    a second chassis portion pivotally connected to said first chassis portion.

3. The apparatus of claim 2 further comprising means for limiting the pivotal travel of said first and second chassis portions with respect to each other to a predetermined range of travel.

4. The apparatus of claim 2 wherein at least one boom assembly is pivotally attached to each said first and second chassis portions.

5. The apparatus of claim 1 wherein each said boom assembly comprises:
    a drive unit pivotally attached to said mobile chassis;
    means for selectively pivoting said drive unit with respect to said mobile chassis;
    a first boom member pivotally connected to said drive unit;
    means for selectively pivoting said first boom member with respect to said drive unit;
    a second boom member pivotally connected to said first boom member; and
    means for selectively pivoting said second boom member with respect to said first boom member.

6. The apparatus of claim 5 wherein each said drive unit has an engine adapted to drive said mobile chassis.

7. The apparatus of claim 5 wherein each said cutting means is pivotally attached to the corresponding said second boom member and further comprises means for selectively pivoting each said cutting means with respect to the corresponding said second boom member.

8. The apparatus of claim 1 wherein said mobile chassis is self-propelled.

9. The apparatus of claim 1 wherein each said cutting means comprises:
    a housing member pivotally attached to the corresponding said boom assembly;

a cutting member rotatably supported within said housing member; and means for rotating said cutting member.

10. The apparatus of claim 9 further comprising guard means for selectively permitting vegetation to enter each said housing to engage said cutting member, said guard means substantially preventing the vegetation from being ejected from said housing upon engagement with said cutting member.

11. The apparatus of claim 10 wherein each said housing has at least a first lateral opening and a second lateral opening through which vegetation may pass to engage the corresponding said cutting member and wherein each said guard means comprises:

a first guard member pivotally attached to the corresponding said housing and being pivotal between a first closed position wherein said first opening is substantially covered and a second open position wherein said first opening is substantially exposed; and a second guard member pivotally attached to the corresponding said housing and being pivotal between a primary closed position wherein said second opening is substantially covered and a secondary open position wherein said second opening is substantially exposed.

12. The apparatus of claim 11 further comprising means for assisting each of said first and second guard members to pivot to said second and secondary positions, respectively when said first and second guard members are contacted by an object.

13. The apparatus of claim 12 wherein said means for assisting said first and said second guard members comprises at least one tension spring attached to said first and said second guard members and extending therebetween.

14. The apparatus of claim 13 wherein each of said first and said second guard members each have a flexible member attached thereto for further preventing debris from being ejected from said housing.

15. The apparatus of claim 14 wherein each said cutting means further comprises means attached to said housing member for selectively spraying herbicide.

16. A mobile vegetation cutting apparatus for cutting vegetation at a plurality of locations and elevations on both sides of a railroad trackway comprising:

a mobile chassis adapted to ride upon the railroad trackway;

at least two boom assemblies pivotally attached to said mobile chassis and each being selectively pivotable to a plurality of vegetation cutting positions on both sides of the railroad trackway; and vegetation cutting means attached to each said boom assembly.

17. The apparatus of claim 16 wherein each said boom assembly comprises:

a drive unit pivotally attached to said mobile chassis;

means for selectively pivoting said drive unit with respect to said mobile chassis;

a first boom member pivotally connected to said drive unit;

means for selectively pivoting said first boom member with respect to said drive unit;

a second boom member pivotally connected to said first boom member; and means for selectively pivoting said second boom member with respect to said first boom member.

18. The apparatus of claim 17 wherein said mobile chassis comprises:

a first chassis portion; and a second chassis portion pivotally connected to said first chassis portion.

19. The apparatus of claim 18 further comprising means for limiting the pivotal travel of said first and second chassis portions with respect to each other to a predetermined range of travel.

20. The apparatus of claim 19 wherein at least one boom assembly is pivotally attached to each of said first and second chassis portions.

21. The apparatus of claim 20 wherein each said cutting means comprises:

a housing member pivotally attached to the corresponding said boom assembly;

a cutting member rotatably supported within said housing member; and means for rotating said cutting member at least one predetermined speed.

22. The apparatus of claim 21 further comprising guard means for selectively permitting vegetation to enter each said housing to engage the corresponding said cutting member, each said guard means substantially preventing the vegetation from being ejected from the corresponding said housing upon engagement with the corresponding said cutting member.

23. The apparatus of claim 22 wherein each said housing has at least a first opening and a second opening through which vegetation may pass to engage said cutting member and wherein each said guard means comprises:

a first guard member pivotally attached to the corresponding said housing and being pivotal between a first closed position wherein said first opening is substantially covered and a second open position wherein said first opening is substantially exposed; and a second guard member pivotally attached to the corresponding said housing and being pivotal between a primary closed position wherein said second opening is substantially covered and a secondary open position wherein said second opening is substantially exposed.

24. The apparatus of claim 23 further comprising means for assisting each of said first and second guard members to pivot to said second and secondary positions, respectively when said first and second guard members are contacted by an object.

25. The apparatus of claim 24 wherein each said means for assisting said first and said second guard members comprises at least one tension spring attached to each of said first and said second guard members and extending therebetween.

26. The apparatus of claim 23 wherein each said first and said second guard members each have a flexible member attached thereto for further preventing debris from being ejected from said housing.

27. The apparatus of claim 21 further comprising means attached to each said housing member for selectively spraying herbicide.

28. The apparatus of claim 16 wherein said mobile chassis is self propelled.

29. A mobile vegetation cutting apparatus for cutting vegetation at a plurality of locations and elevations on both sides of a railroad trackway comprising:

a mobile chassis comprising a first mobile chassis portion adapted to ride upon the railroad trackway and a second mobile chassis portion adapted to ride upon the railroad trackway and being pivotally connected to said first mobile chassis portion;

a first drive unit pivotally attached to said first mobile chassis portion, said first drive unit having power means for driving said mobile chassis on the railroad trackway and being selectively pivotable from one lateral side of said mobile chassis to another lateral side of said mobile chassis;

a first boom assembly comprising a first boom member pivotally connected to said first drive unit, means for selectively pivoting said first boom member with respect to said first drive unit, a second boom member pivotally connected to said first boom member and means for selectively pivoting said second boom member with respect to said first boom member;

a first cutting means comprising a housing member pivotally attached to said second boom member, a cutting member rotatably supported within said housing member and means for rotating said cutting member at at least one predetermined speed;

a first operator's cab operatively connected to said first drive unit;

a second drive unit pivotally attached to said second mobile chassis portion, said second drive unit having secondary power means for driving said mobile chassis on the railroad tracks and being selectively pivotable from one lateral side of mobile chassis to another lateral side of the mobile chassis;

a second boom assembly comprising a primary boom member pivotally connected to said second drive unit, means for selectively pivoting said primary boom member with respect to said first drive unit, a secondary boom member pivotally connected to said primary boom member and means for selectively pivoting said secondary boom member with respect to said primary boom member;

a second cutting means comprising a second housing member pivotally attached to said secondary boom member, a second cutting member rotatably supported within said second housing member and means for rotating said second cutting member at at least one predetermined speed; and a second operator's cab operatively connected to said second drive unit.

30. The apparatus of claim 29 further comprising derailment prevention means attached to said first and second mobile chassis portions for limiting the lateral travel of said first and second mobile chassis portions on the railroad trackway.

31. The apparatus of claim 29 further comprising means for limiting the pivotal travel of the first and second mobile chassis portions with respect to each other to a predetermined range of pivotal travel.

32. A method for cutting vegetation along a railroad trackway having a right lateral side and a left lateral side comprising the steps of:

providing a mobile chassis adapted to ride upon the railroad trackway and having at least two boom and vegetation cutting assemblies pivotally attached thereto, said boom and vegetation cutting assemblies being selectively pivotable to a plurality of vegetation cutting orientations on both sides of the railroad trackway;

pivoting one of said boom and vegetation cutting assemblies to a first vegetation cutting position on the right lateral side of the railroad trackway; and pivoting another of said boom and vegetation cutting assemblies to a second vegetation cutting position on the right lateral side of the railroad trackway; and propelling said mobile chassis along the railroad right-of-way.

33. The method of claim 32 further comprising the step of pivoting at least one of said boom and vegetation cutting assemblies to a third vegetation cutting position on the left lateral side of the railroad trackway.

34. A vegetation cutting apparatus attachable to a mobile vehicle comprising:

a housing member pivotally attachable to the vehicle;

a cutting member rotatably supported within said housing member;

means for rotating said cutting member; and at least one substantially rigid elongated guard means pivotally attached to said housing member, said guard means including biasing means for selectively permitting vegetation to enter said housing member to engage said cutting member, said guard means substantially preventing vegetation from being ejected from said housing member upon engagement with said cutting member.

35. The apparatus of claim 34 wherein said housing has at least a first opening and a second opening through which vegetation may pass to engage said cutting member and wherein said guard means comprises:

a first guard member pivotally attached to said housing and being pivotal between a first closed position wherein said first opening is substantially covered and a second open position wherein said first opening is substantially exposed; and a second guard member pivotally attached to said housing and being pivotal between a primary closed position wherein said second opening is substantially covered and a secondary open position wherein said second opening is substantially exposed.

36. The apparatus of claim 35 wherein said biasing means comprises means for assisting said first and second guard members to pivot to said second and secondary positions, respectively when said first and second guard members are contacted by an object.

37. The apparatus of claim 36 wherein said means for assisting said first and said second guard members comprises at least one tension spring attached to said first and said second guard members and extending therebetween.

38. The apparatus of claim 35 wherein said first and said second guard members each have a flexible member attached thereto for further preventing debris from being ejected from said housing.

* * * * *